(12) United States Patent
Lee (10) Patent No.: US 9,383,985 B2
(45) Date of Patent: Jul. 5, 2016

(54) AUTOMATED MODIFICATION OF PRE-GENERATED MSI PACKAGED APPLICATIONS

(75) Inventor: Andrew Hei-Yin Lee, Rhodes (AU)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/491,656

(22) Filed: Jun. 8, 2012

(65) Prior Publication Data
US 2012/0317564 A1    Dec. 13, 2012

(51) Int. Cl.
*G06F 9/445* (2006.01)
*G06F 11/36* (2006.01)

(52) U.S. Cl.
CPC .. *G06F 8/61* (2013.01); *G06F 8/67* (2013.01); *G06F 9/44521* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 6,324,691 B1 * | 11/2001 | Gazdik | | 717/178 |
| 6,418,554 B1 * | 7/2002 | Delo et al. | | 717/174 |
| 6,629,316 B1 * | 9/2003 | Curtis | | G06F 8/60 717/121 |
| 6,754,896 B2 * | 6/2004 | Mishra et al. | | 717/176 |
| 7,313,783 B2 * | 12/2007 | Luo | | 717/105 |
| 7,360,202 B1 * | 4/2008 | Seshadri et al. | | 717/106 |
| 7,519,964 B1 * | 4/2009 | Islam | | G06F 8/44 717/177 |
| 7,676,474 B2 * | 3/2010 | Gebhart et al. | | 707/999.01 |
| 7,761,595 B1 * | 7/2010 | Drennen et al. | | 709/238 |
| 7,802,087 B2 * | 9/2010 | Gatto et al. | | 713/100 |
| 7,827,548 B1 * | 11/2010 | Anderson | | G06F 8/71 717/174 |
| 8,127,286 B2 * | 2/2012 | London | | 717/169 |
| 8,136,100 B1 * | 3/2012 | Goldman | | 717/136 |
| 8,166,448 B2 * | 4/2012 | Mitra et al. | | 717/100 |
| 8,244,841 B2 * | 8/2012 | Shaji et al. | | 709/223 |
| 8,341,622 B1 * | 12/2012 | Eatough | | 717/177 |
| 2004/0204949 A1 * | 10/2004 | Shaji et al. | | 705/1 |
| 2004/0230971 A1 * | 11/2004 | Rachman et al. | | 717/175 |
| 2004/0255291 A1 * | 12/2004 | Sierer et al. | | 717/174 |
| 2004/0261060 A1 * | 12/2004 | Haselden et al. | | 717/120 |
| 2005/0015775 A1 * | 1/2005 | Russell et al. | | 719/315 |
| 2006/0122937 A1 * | 6/2006 | Gatto et al. | | 705/51 |
| 2006/0143521 A1 * | 6/2006 | Lang | | 714/26 |
| 2006/0161914 A1 * | 7/2006 | Morrison et al. | | 717/174 |
| 2007/0006217 A1 * | 1/2007 | Tammana | | 717/174 |
| 2007/0074197 A1 * | 3/2007 | David Buckley et al. | | 717/168 |
| 2007/0074205 A1 * | 3/2007 | Tammana et al. | | 717/177 |
| 2007/0150887 A1 * | 6/2007 | Shapiro | | 717/174 |
| 2007/0150890 A1 * | 6/2007 | Shapiro | | 717/174 |
| 2007/0156698 A1 * | 7/2007 | Gebhart et al. | | 707/10 |
| 2008/0080491 A1 * | 4/2008 | Saripalli | | 370/378 |
| 2008/0127169 A1 * | 5/2008 | Malasky et al. | | 717/174 |

(Continued)

*Primary Examiner* — Isaac T Tecklu
(74) *Attorney, Agent, or Firm* — Richard J. Gregson (57) ABSTRACT

Deployment packages for applications may be created automatically to deploy unique instances of an application for execution on a computer system. The deployment packages may be created by copying an original deployment package to a new deployment package and modifying properties, attributes, and/or values within the new deployment package. The modified parameters may include a globally-unique identifier (GUID). The modifications to the new deployment package may be performed automatically without access to source code for the application in the original deployment package. The new deployment package may be deployed on a computer system to install a unique instance of the application. Automatic creation of deployment packages may be useful for testing multiple copies of an application in parallel on a computer system.

14 Claims, 7 Drawing Sheets

(56) References Cited

U.S. PATENT DOCUMENTS

| | | | |
|---|---|---|---|
| 2008/0141242 A1* | 6/2008 | Shapiro | 717/174 |
| 2008/0263511 A1* | 10/2008 | Shapiro | 717/104 |
| 2009/0030975 A1* | 1/2009 | Gupta | 709/203 |
| 2009/0158270 A1* | 6/2009 | Funk et al. | 717/174 |
| 2009/0164979 A1* | 6/2009 | Fischer | 717/128 |
| 2009/0181665 A1* | 7/2009 | Sater et al. | 455/424 |
| 2010/0023934 A1* | 1/2010 | Sheehan et al. | 717/168 |
| 2010/0138823 A1* | 6/2010 | Thornley | 717/174 |
| 2010/0228594 A1* | 9/2010 | Chweh et al. | 705/10 |
| 2010/0313031 A1* | 12/2010 | Jaslet et al. | 713/176 |
| 2011/0029966 A1* | 2/2011 | Moshir et al. | 717/173 |
| 2011/0055807 A1* | 3/2011 | Mahajan et al. | 717/107 |
| 2011/0191500 A1* | 8/2011 | Odayappan et al. | 710/8 |
| 2011/0225579 A1* | 9/2011 | Khandelwal | 717/177 |
| 2011/0302569 A1* | 12/2011 | Kunze et al. | 717/169 |
| 2011/0307531 A1* | 12/2011 | Gaponenko et al. | 707/822 |
| 2012/0036125 A1* | 2/2012 | Al-Kofahi et al. | 707/728 |
| 2012/0124565 A1* | 5/2012 | Salle et al. | 717/162 |
| 2012/0159468 A1* | 6/2012 | Joshi et al. | 717/172 |
| 2012/0167073 A1* | 6/2012 | Stevens | 717/175 |
| 2012/0266156 A1* | 10/2012 | Spivak et al. | 717/172 |
| 2012/0284706 A1* | 11/2012 | Cui et al. | 717/178 |
| 2012/0290535 A1* | 11/2012 | Patel et al. | 707/634 |
| 2012/0291114 A1* | 11/2012 | Poliashenko et al. | 726/8 |

\* cited by examiner

AUTOMATED MODIFICATION OF PRE-GENERATED MSI PACKAGED APPLICATIONS

FIELD OF THE DISCLOSURE

The instant disclosure relates to computer software. More specifically, this disclosure relates to packaging of computer software for installation.

BACKGROUND

Software installed on a computer uses a specific identifier, such as a globally-unique identifier (GUID), to interact with hardware and other software on the computer. Different versions of a software program and different software programs may have different GUIDs. Conventionally, these GUIDs are pre-generated and encoded into the source code of software before compilation and incorporation into a deployment package file from which the software is installed on a computer. The software, once installed on the computer, retains the GUID coded into the software prior to compilation.

However, there may be situations where modifying the deployment package after generation would be advantageous. For example, when testing an application it may be advantageous to execute multiple copies of the software in parallel on the computer, with each copy having minor variations. In a situation such as this, each copy of the software may require a unique GUID to operate on the computer.

Conventionally, a separate executable file is compiled for each variant of the software and packaged in a deployment package. That is, the GUIDs would be modified before compilation of the software and pre-generation of the deployment package. However, when many small variations of a software package are being deployed, this solution may be undesirably slow. Compiling each application separately is also undesirable when the software is distributed to end users, because the slow process of compiling new applications restricts the number of end users the software may be sold to.

In another conventional solution, an end user may be prompted to respond to questions during installation to customize their application. However, because the user's input is provided after the software has already been compiled and packaged into a deployment package, the customization is limited. For example, compile-time variables, such as GUIDs, cannot be changed after compilation of the application.

In yet another conventional solution, the user may be provided with the source code and allowed to recompile the source code with the desired modifications. However, the end-user requires access to the source code and a development environment to recompile the software. In addition to requirements on the end-user, this solution is undesirable because it fails to preserve the intellectual property rights associated with the application.

SUMMARY

According to one embodiment, a method includes preparing a deployment package for a unique instance. The method also includes creating an executable file for the unique instance. The method further includes updating a configuration file for the unique instance. The method also includes packaging the executable file and the configuration file with the deployment package.

According to another embodiment, a computer program product includes a non-transitory computer readable medium having code to prepare a deployment package for a unique instance. The medium also includes code to create an executable file for the unique instance. The medium further includes code to update a configuration file for the unique instance. The medium also includes code to package the executable file and the configuration file with the deployment package.

According to a further embodiment, an apparatus includes a memory and a processor coupled to the memory. The processor is configured to prepare a deployment package for a unique instance. The processor is also configured to create an executable file for the unique instance. The processor is further configured to update a configuration file for the unique instance. The processor is also configured to package the executable file and the configuration file with the deployment package.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Modifications to software, such as changing the globally-unique identifier (GUID), may be automated to allow quick deployment of multiple copies of an application on a computer system. According to one embodiment, the GUID may be modified post-generation of the deployment package. For example, an existing deployment package may be copied to a new deployment package and modified to perform different functions and to have a different GUID. The new deployment package may then be deployed on the computer. Additional deployment packages may also be generated automatically and deployed on the computer.

Figure 1:
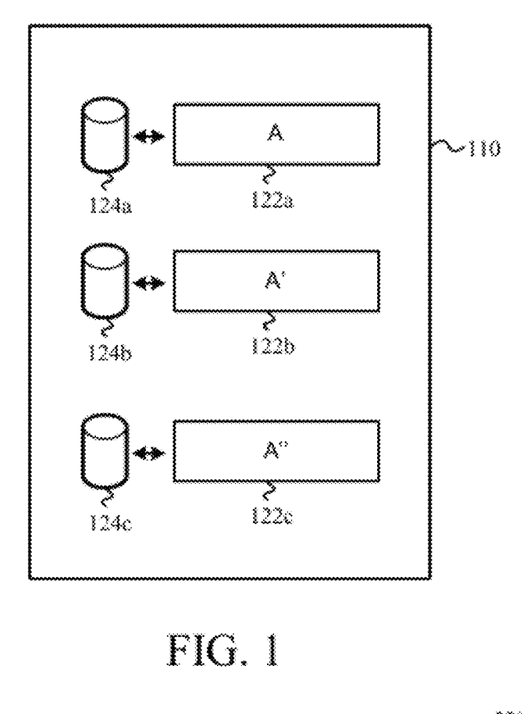
FIG. 1 is a block diagram illustrating multiple unique instances of an application executing on a computer system according to one embodiment of the disclosure.

FIG. 1 is a block diagram illustrating multiple unique instances of an application executing on a computer system according to one embodiment of the disclosure. A computer system 110 may execute a number of unique instances 122a-c of an application. For example, the unique instances 122a, 122b, and 122c may each have a unique GUID value. Although only GUID is described, the unique instances 122a-c may have other unique properties for identifying a particular one of the unique instances 122a-c. Each of the unique instances 122a-c of an application may access a database 124a-c, respectively. Although the databases 124a-c are illustrated as separate databases, the databases 124a-c may be the same database. For example, three separate interfaces to a single database may be provided to the unique instances 122a-c of an application, with the separate interfaces identified by a unique name.

Figure 2:
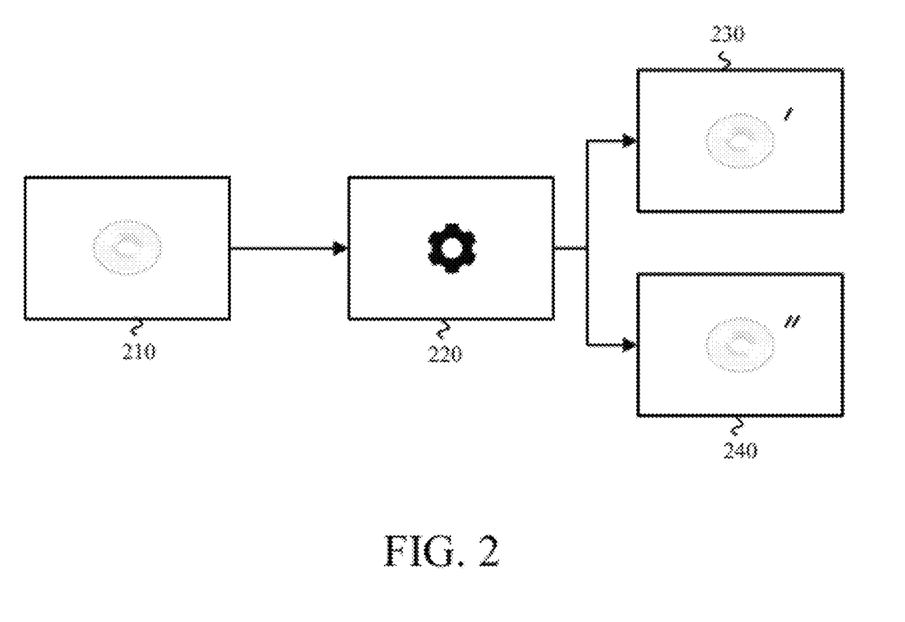
FIG. 2 is a block diagram illustrating the generation of unique instances of an application according to one embodiment of the disclosure.

The unique instances 122a-c of an application may be installed from automatically generated deployment packages. FIG. 2 is a block diagram illustrating the generation of unique instances of an application according to one embodiment of the disclosure. A deployment package manager 220 may access an original deployment package 210 and generate new deployment packages 230 and 240 based, in part, on the original deployment package 210. For example, the manager 220 may extract certain contents of the original deployment package 210, such as certain executable files and configuration files. The executable files and configuration files extracted from the package 210 may be modified based on parameters supplied to the manager 220. The deployment packages 210, 230, and 240 may include binaries that encapsulate the behavior of the business logic, configuration files for registering the application and for administering the application, client interface screens for the application, and a database schema for the application.

After modifying portions of the application extracted from the package 210, the manager 220 may rebuild the application and package the application in the new deployment package 230 with other contents extracted from the package 210 that were not modified, such as the application business logic. According to one embodiment, the manager 220 may generate the new deployment packages 230 and 240 without access to source code for the application contained in the original software installation package 210 and without modifying the application business logic of binary executables. The manager 220 may repeat the process to create additional deployment packages, such as the deployment package 240. During creation of the packages 230 and 240, the manager 220 may specify parameters for the packages 230 and 240 including: package path, instance name, package installation date, database scheme name, database name, database server registration, configuration name, package creator, and AB Suite Framework version number.

According to one embodiment, each of the new deployment packages 230 and 240 may be variations of the original deployment package 210. For example, each of the new deployment packages 230 and 240 may have minor code variations and different unique GUIDs. However, the new deployment packages 230 and 240 may also be significantly different from the original deployment package 210.

The deployment package manager 220 may also be used for the distribution of patches to the unique instances of the application after creation of the new deployment packages 230 and 240. For example, if a developer deploys a new patch to the application within the original deployment package 210, the patch may be accessed by the manager 220 and replicated with appropriate modifications for modifying unique instances of the application deployed from the new software installation packages 230 and 240.

Figure 3:
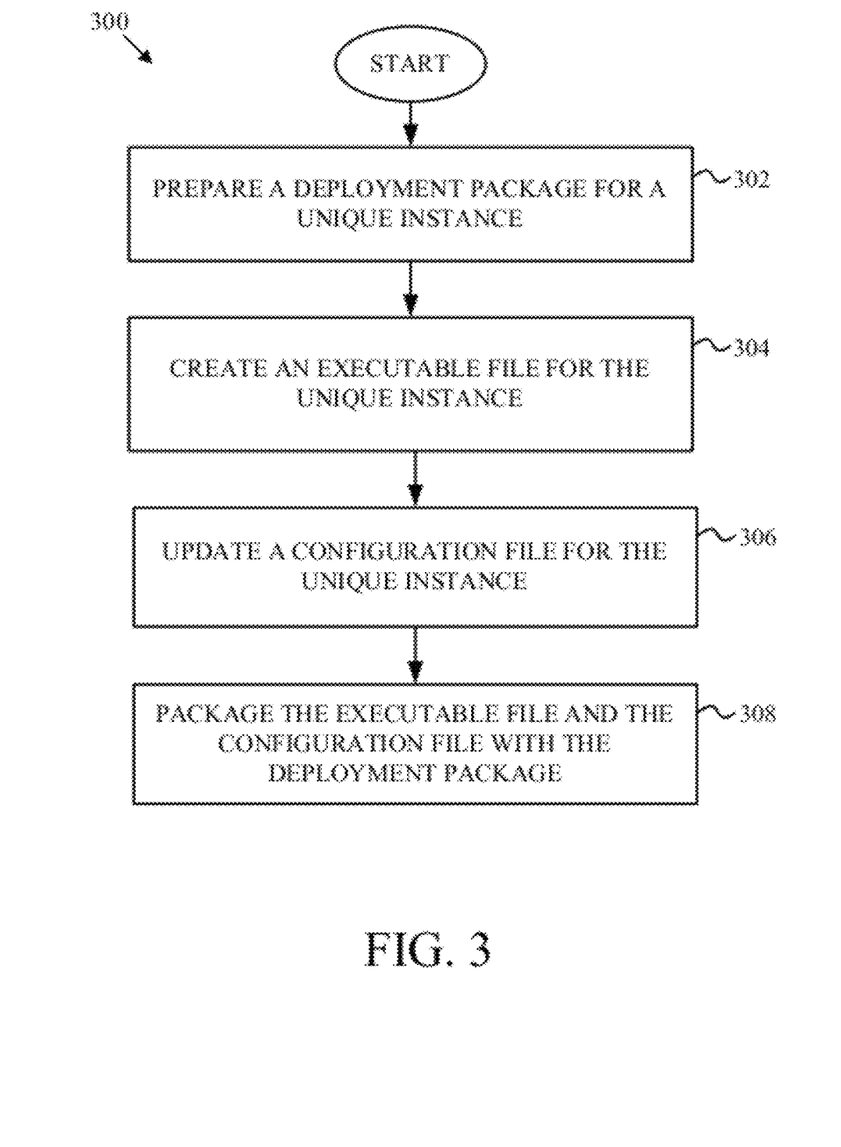
FIG. 3 is a flow chart illustrating a method for creating a deployment package for a unique instance of an application according to one embodiment of the disclosure.

The new deployment packages 230 and 240 for use in deploying unique instances of applications may be generated by the deployment package manager 220 according to a method, such as the method described in FIG. 3. FIG. 3 is a flow chart illustrating a method for creating a deployment package for a unique instance of an application according to one embodiment of the disclosure. A method 300 begins at block 302 with preparing a deployment package for a unique instance. A new deployment package may be prepared by copying an original deployment package to a new deployment package and changing identifiers or parameters within the new deployment package such that the new deployment package is unique from the original deployment package. According to one embodiment, the deployment package may be a Microsoft installer package (MSI package).

At block 304, an executable file may be created to correspond with a unique instance of the application deployed by the new deployment package. The executable file may be, for example, a dynamic link library (DLL) file, or another executable file. Methods for creating the executable file are discussed below with reference to FIGS. 4, 5, and 6. The executable file may be created based, in part, on predetermined parameters, such as described above with reference to FIG. 2.

At block 306, a configuration file may be updated to correspond with the unique instance of the application deployed by the new deployment package. The configuration files may be updated to include a different system name, an alternate name, a different package name, and/or a different program identifier that corresponds to the unique instance. The update to the configuration files may be carried out by copying the original configuration file from the original deployment package and modifying the file to include new properties and/or parameters for the unique instance. According to one embodiment, the updated configuration files may include a ispec.xml file and/or a system.config file. The updates to the configuration file may be made based, in part, on predetermined parameters, such as described above with reference to FIG. 2.

At block 308, the executable file created at block 304 and the configuration file updated at block 306 may be packaged in the new deployment package prepared at block 302. According to one embodiment, the executable file and the configuration file may be added to a cabinet (CAB) file using cabarc.exe. The cabinet file may then be added to the new deployment package using msidb.exe.

The new deployment package created by the method 300 of FIG. 3 may be used to deploy a unique instance of an application on a computer system. For example, the method 300 may be repeated one or more time to generate additional software packages, which are then deployed on the same machine as unique instances of the application of the original deployment package. Providing several unique instances of the application for execution on a single computer may improve an administrator's ability to scale to handle large transactional loads without adding additional hardware to the computer. In particular, automating the creation of deployment packages, which may be deployed as unique instances of an application, may improve the flexibility of the computer, may improve the resilience of the computer to failure, and may decrease the down time resulting from computer failures.

Figure 4:
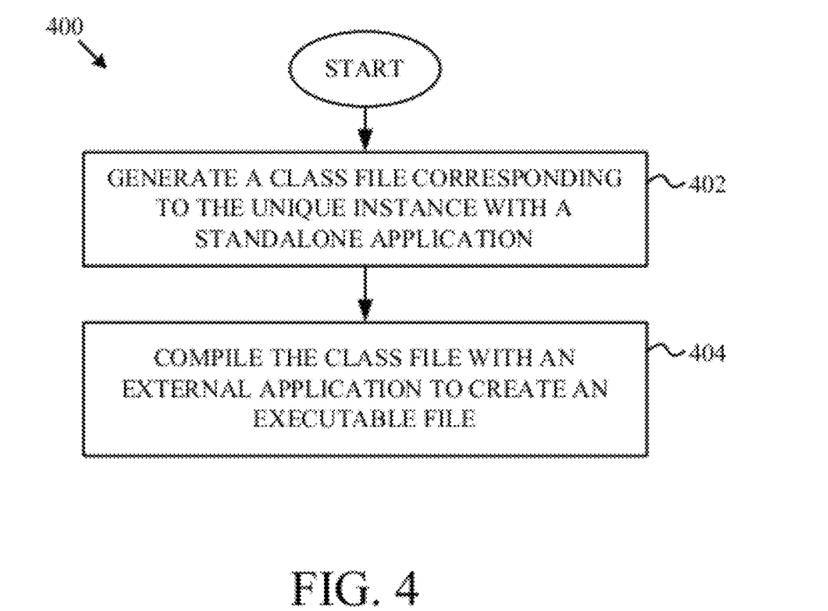
FIG. 4 is a flow chart illustrating a method for creating an executable file for a unique instance of an application according to a first embodiment of the disclosure.

FIG. 4 is a flow chart illustrating a method for creating an executable file for a unique instance of an application according to a first embodiment of the disclosure. A method 400 may be employed to generate classes for an executable file that are then compiled to create the executable file. A method 400 begins at block 402 with a standalone application generating a class file corresponding to the unique instance with a standalone application. For example, the standalone application may generate one of a commanager.cs class, an assemblyinfo.cs, and/or a linker response (RSP) file. The generated class files may have unique values for a program identification (ProgID) attribute, a GUID attribute, and an application name attribute.

At block 404, the class file is compiled with an external application to create the executable file. The class files generated by the standalone application at block 402 may be compiled by an external application different from the standalone application. For example, the external application may be a command-line builder, such as the csc.exe program. The external application may be selected for compiling based on the applications available on the computer. For example, when the computer includes the .NET framework, the scs.exe file may be available for compiling the executable file. The executable file generated by the external application may be a binary executable (EXE) file, a dynamic link library (DLL) file, and/or a program database (PDB) file.

Figure 5:
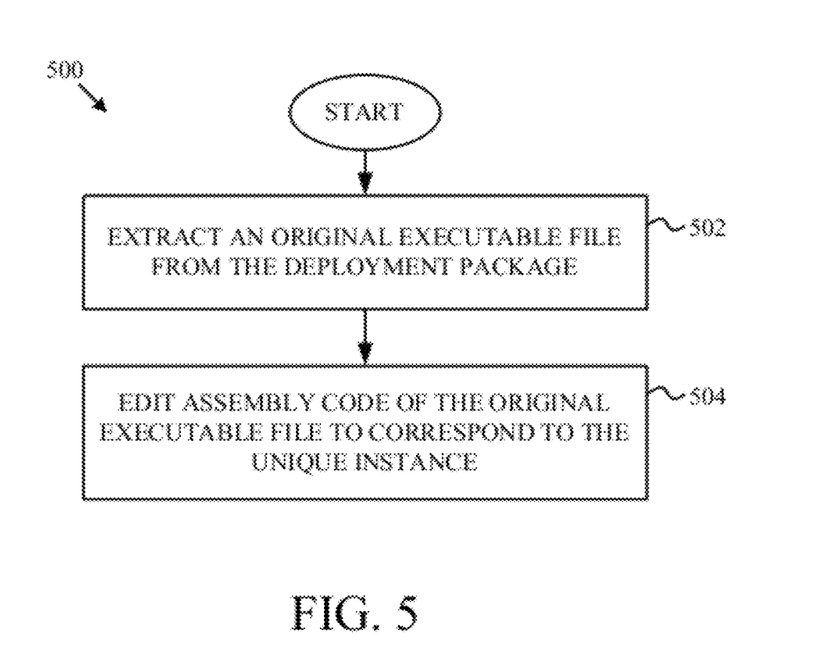
FIG. 5 is a flow chart illustrating a method for creating an executable file for a unique instance of an application according to a second embodiment of the disclosure.

FIG. 5 is a flow chart illustrating a method for creating an executable file for a unique instance of an application according to a second embodiment of the disclosure. A method 500 begins at block 502 with extracting an original executable file from the deployment package. For example, a standalone application may extract a dynamic link library (DLL) file from the deployment package and may obtain the intermediate language (IL) code from the DLL file using ildasm.exe.

At block 504, the assembly code of the executable file is edited to correspond to the unique instance of the application. The edits may change a program identifier (progID) attribute, a GUID attribute, and/or a ConstructionEnabled attribute of the executable file to correspond to the unique instance of the application being deployed. A new dynamic link library (DLL) file may then be created from the modified executable file using ilasm.exe.

Figure 6:
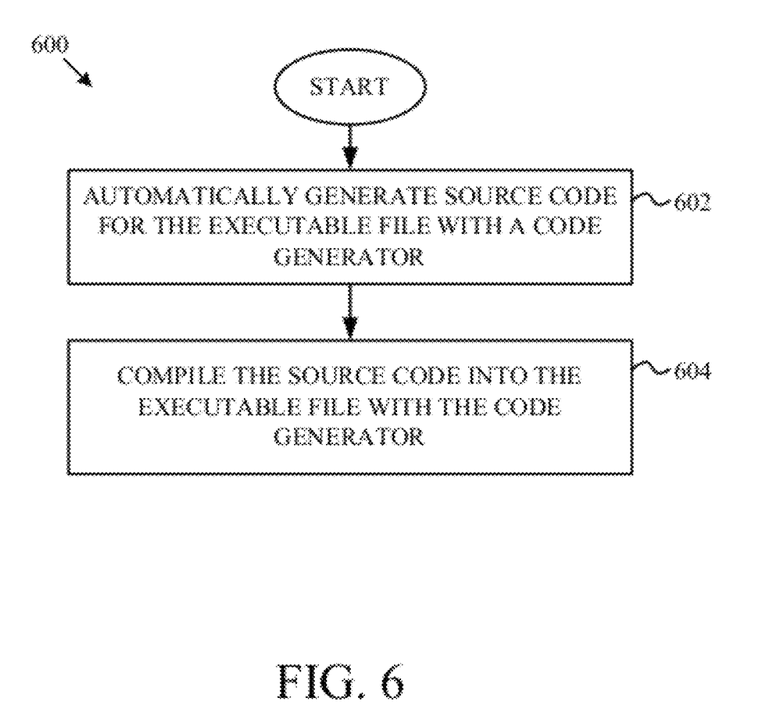
FIG. 6 is a flow chart illustrating a method for creating an executable file for a unique instance of an application according to a third embodiment of the disclosure.

FIG. 6 is a flow chart illustrating a method for creating an executable file for a unique instance of an application according to a third embodiment of the disclosure. A method 600 begins at block 602 with automatically generating source code for the executable file with a code generator. The generated source code may be, for example, C# code generated by procedures contained within the CSharpProvider class of the CodeDom namespace. The source code may be generated to include attributes corresponding to the unique instance of the application, such as a program identifier (progID) attribute and/or a GUID attribute.

At block 604, the source code generated at block 602 may be compiled into the executable file by the code generator. In one example when the source code is generated by the CSharpProvider class of the CodeDom namespace, the csc.exe program may be used to compile the generated source code.

Figure 7:
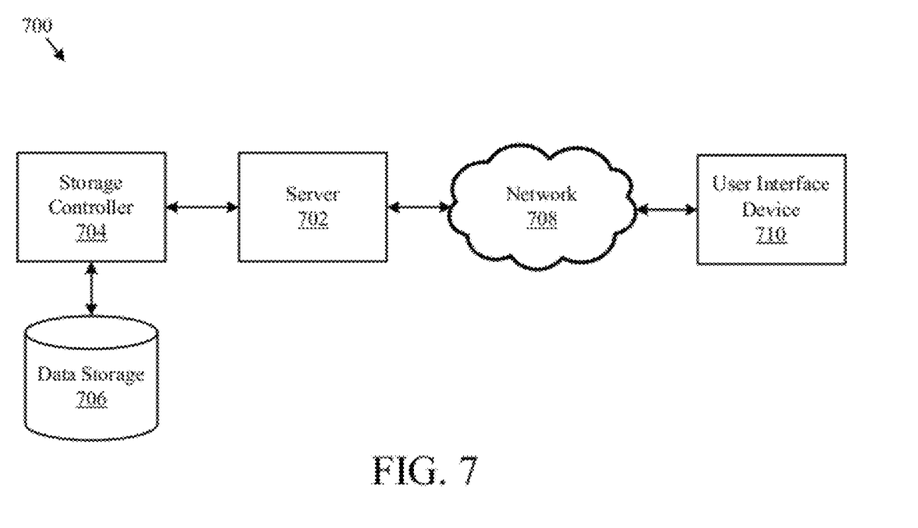
FIG. 7 is a block diagram illustrating a computer network according to one embodiment of the disclosure.

FIG. 7 illustrates one embodiment of a system 700 for an information system, including a system for processing deployment packages. The system 700 may include a server 702, a data storage device 706, a network 708, and a user interface device 710. The server 702 may be a dedicated server or one server in a cloud computing system. The server 702 may also be a hypervisor-based system executing one or more guest partitions. Each guest partition may execute a deployment package manager for generating deployment packages for execution on the guest partition. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708. The data storage device 706 may host original deployment packages for access by the deployment package managers executing on the system 700.

In one embodiment, the user interface device 710 is referred to broadly and is intended to encompass a suitable processor-based device such as a desktop computer, a laptop computer, a personal digital assistant (PDA) or tablet computer, a smartphone or other a mobile communication device having access to the network 708. When the device 710 is a mobile device, sensors (not shown), such as a camera or accelerometer, may be embedded in the device 710. When the device 710 is a desktop computer the sensors may be embedded in an attachment (not shown) to the device 710. In a further embodiment, the user interface device 710 may access the Internet or other wide area or local area network to access a web application or web service hosted by the server 702 and provide a user interface for enabling a user to enter or receive information. For example, an administrator may configure a range of GUIDs for use by the deployment package manager when generating new deployment packages.

The network 708 may facilitate communications of data, such as deployment packages, between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate sever (not shown). For example, in a cloud application the user interface device 710 may access an application server. The application server may fulfill requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

Figure 8:
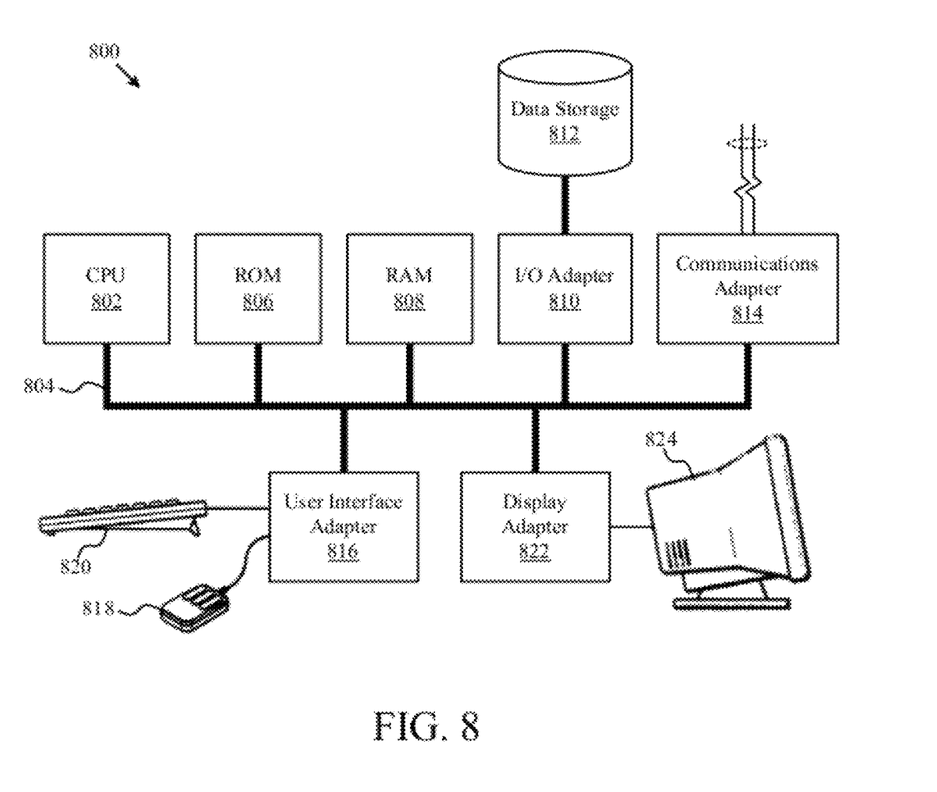
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 9A:
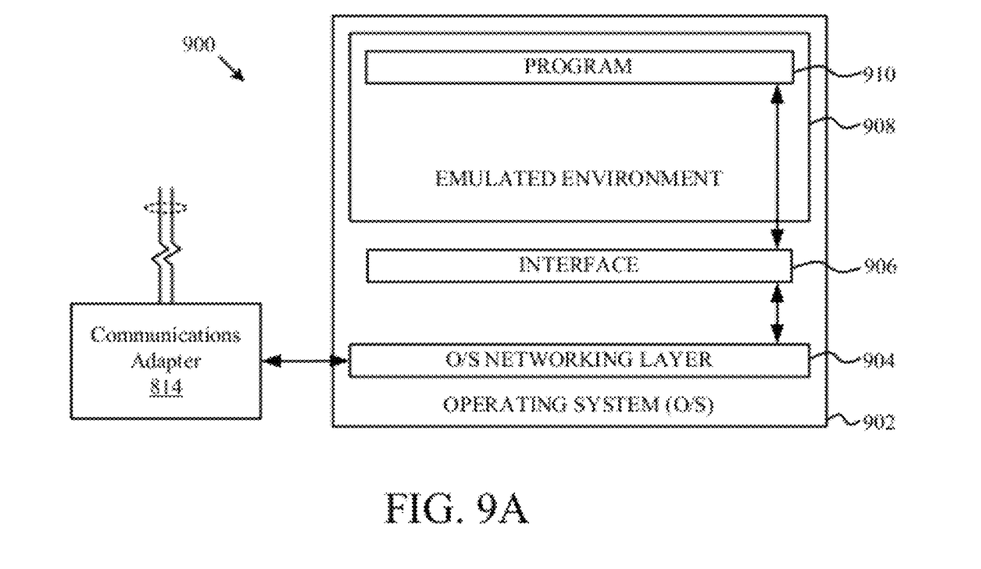
FIG. 9A is a block diagram illustrating a server hosting an emulated software environment for virtualization according to one embodiment of the disclosure.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 9B:
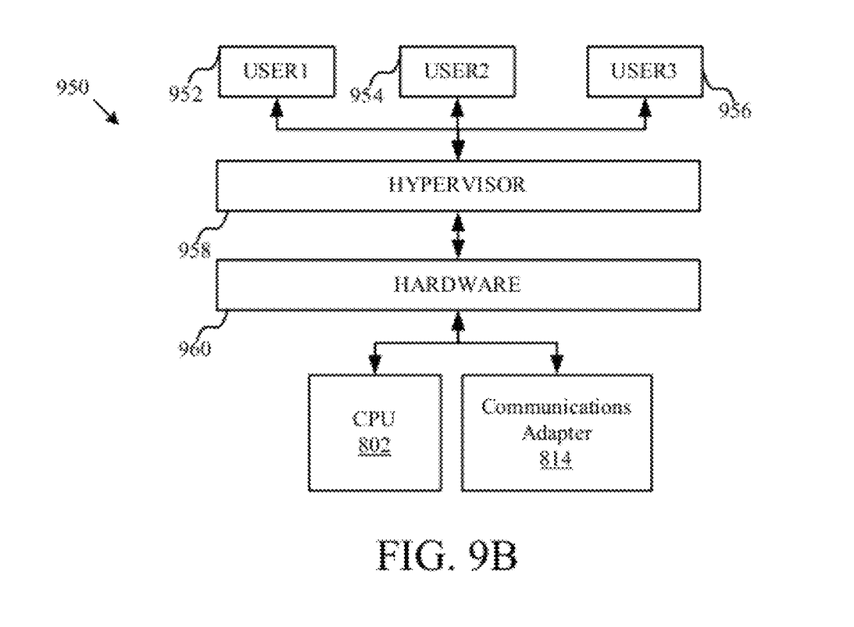
FIG. 9B is a block diagram illustrating a server hosing an emulated hardware environment according to one embodiment of the disclosure.

In another example, hardware in a computer system may be virtualized through a hypervisor. FIG. 9B is a block diagram illustrating a server hosing an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 862 and the communications adaptor 864.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to

What is claimed is:

1. A method, comprising:
preparing a deployment package for a unique instance via copying a first deployment package to a second deployment package automatically and changing an identifier or a parameter within the second deployment package automatically such that the second deployment package is unique from the first deployment package at least via a unique identifier;
creating an executable file for the unique instance, wherein creating the executable file comprises creating a dynamic link library (DLL);
generating a class file corresponding to the unique instance by a standalone application; and compiling the class file with an external application to create the DLL;
updating a configuration file for the unique instance; and
packaging the executable file and the configuration file with the deployment package to create the unique instance of the deployment package for a unique copy of an existing application.

2. The method of claim 1, in which the step of packaging comprises creating a Microsoft installer package (MSI).

3. The method of claim 1, in which the step of updating the configuration file comprises at least one of:
updating the configuration file with a different system name;
updating the configuration file with an alternate name;
updating the configuration file with a different package name;
updating the configuration file with a different program identification.

4. The method of claim 1, in which the step of creating the DLL comprises:
extracting an original DLL from the deployment package; and
editing assembly code in the DLL to correspond to the unique instance.

5. The method of claim 1, in which the step of creating the DLL comprises:
generating source code corresponding to the unique instance for the DLL with a code generator; and
compiling the source code into the DLL with the code generator.

6. The method of claim 1, further comprising executing the deployment package on a hypervisor-based platform.

7. A computer program product, comprising:
a non-transitory computer readable medium comprising:
code to prepare a deployment package for a unique instance via copying a first deployment package to a second deployment package automatically and changing an identifier or a parameter within the second deployment package automatically such that the second deployment package is unique from the first deployment package at least via a unique identifier;
code to create an executable file for the unique instance, wherein the code to create the executable file for the unique instance comprises code to create a dynamic link library (DLL);
code to generate a class file corresponding to the unique instance by a standalone application; and code to compile the class file with an external application to create the DLL;
code to update a configuration file for the unique instance; and
code to package the executable file and the configuration file with the deployment package to create the unique instance of the deployment package for a unique copy of an existing application.

8. The computer program product of claim 7, in which the medium further comprises code to create a Microsoft installer package (MSI).

9. The computer program product of claim 7, in which the medium further comprises at least one of:
code to update the configuration file with a different system name;
code to update the configuration file with an alternate name;
code to update the configuration file with a different package name;
code to update the configuration file with a different program identification.

10. The computer program product of claim 7, in which the medium further comprises:
code to extract an original DLL from the deployment package; and
code to edit assembly code in the DLL to correspond to the unique instance.

11. The computer program product of claim 7, in which the medium further comprises:
code to generate source code corresponding to the unique instance for the DLL with a code generator; and
code to compile the source code into the DLL with the code generator.

12. An apparatus, comprising:
a memory; and
a processor coupled to the memory, in which the processor is configured:
to prepare a deployment package for a unique instance via copying a first deployment package to a second deployment package automatically and changing an identifier or a parameter within the second deployment package automatically such that the second deployment package is unique from the first deployment package at least via a unique identifier;
to create an executable file for the unique instance; to create dynamic link library (DLL);
to generate a class file corresponding to the unique instance by a standalone application; and to compile the class file with an external application to create the DLL;
to update a configuration file for the unique instance; and
to package the executable file and the configuration file with the deployment package to create the unique instance of the deployment package for a unique copy of an existing application.

13. The apparatus of claim 12, in which the processor is further configured:
to extract an original DLL from the deployment package; and
to edit assembly code in the DLL to correspond to the unique instance.

14. The apparatus of claim 12, in which the processor is further configured:
to generate source code corresponding to the unique instance for the DLL with a code generator; and
to compile the source code into the DLL with the code generator.

* * * * *